United States Patent
Otsuka

(10) Patent No.: US 8,303,188 B2
(45) Date of Patent: Nov. 6, 2012

(54) BEARING APPARATUS

(75) Inventor: Katsunori Otsuka, Kashiwara (JP)

(73) Assignee: JTEKT Corporation, Osaka-Shi, Osaka (JP)

( * ) Notice: Subject to any disclaimer, the term of this patent is extended or adjusted under 35 U.S.C. 154(b) by 1008 days.

(21) Appl. No.: 12/314,012

(22) Filed: Dec. 2, 2008

(65) Prior Publication Data

US 2009/0148092 A1    Jun. 11, 2009

(30) Foreign Application Priority Data

Dec. 5, 2007   (JP) ................. 2007-314341

(51) Int. Cl.
*F16C 43/00* (2006.01)
*F16C 43/04* (2006.01)

(52) U.S. Cl. .................... 384/537; 384/585

(58) Field of Classification Search ............ 384/537, 384/538, 539, 447, 906, 584, 585, 617
See application file for complete search history.

(56) References Cited

U.S. PATENT DOCUMENTS

| | | | | |
|---|---|---|---|---|
| 1,894,414 A | * | 1/1933 | Olson | 384/538 |
| 3,918,779 A | * | 11/1975 | Halliger et al. | 384/538 |
| 4,210,372 A | * | 7/1980 | McGee et al. | 384/584 |
| 4,240,677 A | * | 12/1980 | Payne et al. | 384/252 |
| 6,270,260 B1 | * | 8/2001 | Hale | 384/537 |

FOREIGN PATENT DOCUMENTS

| | | |
|---|---|---|
| DE | 10 2006 025 033 A1 | 12/2006 |
| GB | 1002919 A | 9/1965 |
| GB | 2 212 566 A | 7/1989 |
| JP | 2000-110843 | 4/2000 |
| JP | 2004-239388 | 8/2004 |
| JP | 2007-92863 | 4/2007 |
| JP | 2007-239955 | 9/2007 |
| KR | 2006032906 A * | 4/2006 |

OTHER PUBLICATIONS

European Search report dated Aug. 11, 2009.

* cited by examiner

*Primary Examiner* — Phillip A Johnson
(74) *Attorney, Agent, or Firm* — McGinn IP Law Group, PLLC

(57) ABSTRACT

An outer ring is provided with a key groove radially extending from an inner diameter to an outer diameter on an end surface thereof. A key member includes an annular body, an inwardly projecting part which is provided on an inner periphery of the annular body and adapted to be inserted into the key groove of the outer ring, and an outwardly projecting part which is provided on an outer periphery of the annular body and adapted to be inserted into a key groove of an axle box.

14 Claims, 5 Drawing Sheets

BEARING APPARATUS

BACKGROUND OF THE INVENTION

The present invention relates to a bearing apparatus, and more particularly, to the bearing apparatus in which an outer ring is supported by an axle box so as to move in an axial direction.

Conventionally, as a bearing apparatus to be used in a motor, for example, there has been known a bearing apparatus including a pair of rolling bearings, one of which is positioned at a fixed side and the other is positioned at a free side, and so constructed that an outer ring of the rolling bearing at the free side is fixed to an axle box provided with a key groove in a manner restrained from rotation by means of a key member, and supported so as to move in an axial direction, thereby to absorb a difference in thermal expansion of a rotation shaft during operation (JP-A-2004-239388). In JP-A-2004-239388, it is disclosed that a key hole in a columnar shape or in a square pillar shape is provided on an outer peripheral surface of the outer ring of the bearing, and a lower end of a key member in a columnar shape or in a square pillar shape is inserted into the key hole, while an upper part of the key member is movably inserted into the key groove in the axle box, thereby permitting the outer ring and the axle box to move within a range of the key groove.

Although ceramics are preferably employed as material for the rolling bearing which is used in an environment where thermal expansion must be taken into consideration, it is difficult to work the keyhole in a columnar shape or in a square pillar shape in brittle material such as ceramics. Therefore, there is a problem that the bearing apparatus disclosed in JP-A-2004-239388 can be applied only in case where metallic material such as bearing steel is employed as the material for the bearing, but cannot be applied in case where the brittle material is employed.

SUMMARY OF THE INVENTION

In view of the above, it is an object of the invention to provide a bearing apparatus in which an outer ring can be easily worked, even though it is formed of brittle material, so that the outer ring can be restrained from rotation but can move in an axial direction.

According to a first aspect of the invention, there is provided a bearing apparatus to be supported by an axle box which includes a key groove, the bearing apparatus comprising:

an outer ring which includes a first key groove extending from an inner diameter to an outer diameter of an end surface of the outer ring;

an inner ring;

rolling elements rollably interposed between the outer and inner rings; and a key member which includes an annular body, a first inwardly projecting part which is provided on an inner periphery of the annular body and adapted to be inserted into the first key groove of the outer ring, and an outwardly projecting part which is provided on an outer periphery of the annular body and adapted to be inserted into the key groove of the axle box.

In the bearing apparatus according to the first aspect of the invention, although it would be sufficient that the key groove of the outer ring is provided at only one position, the key grooves may be provided at a plurality of positions. In any case, the one key groove is formed so as to extend from the inner diameter to the outer diameter without necessity of leaving a part (a peripheral part or a bottom part of a hole). Accordingly, it is possible to easily form the key groove by cutting work, even though the outer ring is formed of brittle material. In case of conducting the cutting work, there is no difference in working trouble between the work for forming the key groove extending from the inner diameter to the outer diameter and the work for continuously cutting the outer ring from one outer diameter to the other diameter, and therefore, it is possible to conduct the latter work and then, to form the key grooves extending from the inner diameter to the outer diameter at two positions separated from each other by 180 degree.

Usually, the inwardly projecting part to be inserted into the key groove of the outer ring is not permitted to move both in a circumferential direction and in an axial direction for restraining the rotation of the outer ring. However, the inwardly projecting part may be made movable to some extent in the circumferential direction, because rotation detent function can be attained even though there is a play in the circumferential direction. Moreover, the outwardly projecting part to be inserted into the key groove of the axle box is usually not permitted to move in the circumferential direction but can move in the axial direction. In this manner, the outer ring is restrained from rotation but can move in the axial direction with respect to the axle box, and favorably support the rotation shaft which is liable to vary in length due to thermal expansion. In case where the outer ring need not move in the axial direction, the outwardly projecting part may be made so as not to move in the axial direction too. In this manner, the outer ring can be fixed to the axle box.

The annular body of the key member includes, for example, a cylindrical part and an inwardly directed flange part which is provided at one end of the cylindrical part. The cylindrical part covers an outer peripheral surface of the outer ring, and the inwardly directed flange part covers one end surface of the outer ring. In this case, the cylindrical part may be fitted to the outer ring by press fitting or may be loosely fitted. The annular body of the key member may be modified according to the shape of the axle box. For example, in case where there is no clearance between the axle box and the outer ring, the annular body may be formed in a square shape in cross section, and butted against the one end surface of the outer ring. In any case, the key member can be attached to the outer ring in advance, by inserting its inwardly projecting part into the key groove of the outer ring, and thus, the outer ring provided with the key member can be handled as a single component.

According to a second aspect of the invention, there is provided a bearing apparatus to be supported by an axle box which includes a key groove, the bearing apparatus comprising:

an outer ring which has an outer peripheral surface formed into an eccentric surface;

an inner ring;

rolling elements rollably interposed between the outer and inner rings; and a key member which includes an annular body having an inner peripheral surface corresponding to the eccentric surface of the outer ring and an outer peripheral surface in a cylindrical surface, and an outwardly projecting part which is provided on an outer periphery of the annular body and adapted to be inserted into the key groove of the axle box.

According to the bearing apparatus of the second aspect of the invention, the inner peripheral surface of the annular body of the key member lies along the eccentric surface of the outer ring thereby to restrain the outer ring from rotation. The outwardly projecting part to be inserted into the key groove of the axle box is usually not permitted to move in the circumferential direction but permitted to move in the axial direction. In this manner, the outer ring is restrained from rotation but can move in the axial direction with respect to the axle box, and favorably support the rotation shaft which is liable to vary in length due to thermal expansion. In case where the outer ring need not move in the axial direction, the outwardly projecting part may be made so as not to move in the axial direction too. In this manner, the outer ring can be fixed to the axle box.

In the bearing apparatus according to the first and second inventions, the key member is formed of metal such as steel, in some cases. In this case, it is possible to coat the outer peripheral surface of the key member which slides with respect to the axle box with polytetrafuluoroethylene (PTFE), diamond-like carbon (DLC), etc. which are excellent in abrasion resistance and sliding performance. In some other cases, the key member is formed of synthetic resin such as polyetherether ketone (PEEK). In this case, the key member can be formed of synthetic resin by injection molding, and hence, the key member in various shapes can be easily formed. Moreover, it is possible to obtain the key member which is integrally formed with the outer ring, by molding the outer ring out of resin, employing resin molding process. In this manner, it becomes easier to produce the key member and handle the key member thereafter. The bearing apparatus according to the second invention is particularly suitable in case of employing the resin molding process.

As the rolling bearing constituting the bearing apparatus, a deep groove ball bearing or an angular ball bearing in which the rolling element is a ball may be used, for example. However, the rolling bearing is not limited to them.

In some cases, an intermediate housing which moves integrally with the outer ring is interposed between the axle box provided with the key groove and the outer ring. In this case, the intermediate housing is deemed as a part of the outer ring, and at least one key groove extending from an inner diameter to an outer diameter may be formed on an end surface of the intermediate housing. On the other hand, the key member may include an annular body, an inwardly projecting part to be inserted into the key groove of the intermediate housing, and an outwardly projecting part provided on an outer periphery of the annular body and adapted to be inserted into the key groove of the axle box.

According to the bearing apparatus of the invention, it is possible to easily work the outer ring, even though it is formed of brittle material, and by attaching this outer ring to the axle box by way of the key member, the rotation of the outer ring can be restrained, while the axial movement of the outer ring is permitted.

DETAILED DESCRIPTION OF PREFERRED EMBODIMENTS

Figure 3:
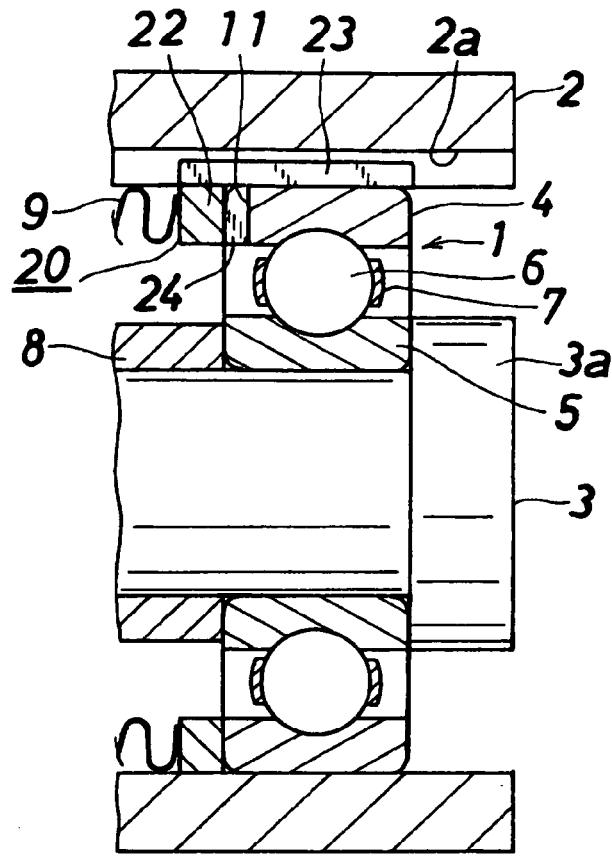
FIG. 3 is a vertical sectional view showing a bearing apparatus in a second embodiment according to the invention.

Now, embodiments of the invention will be described referring to the drawings. It is to be noted that terms "right and left", and "upper and lower" in the following description respectively mean a right side and a left side, and an upper side and a lower side in a vertical sectional view as shown in FIGS. 1 and 3.

First Embodiment

Figure 1:
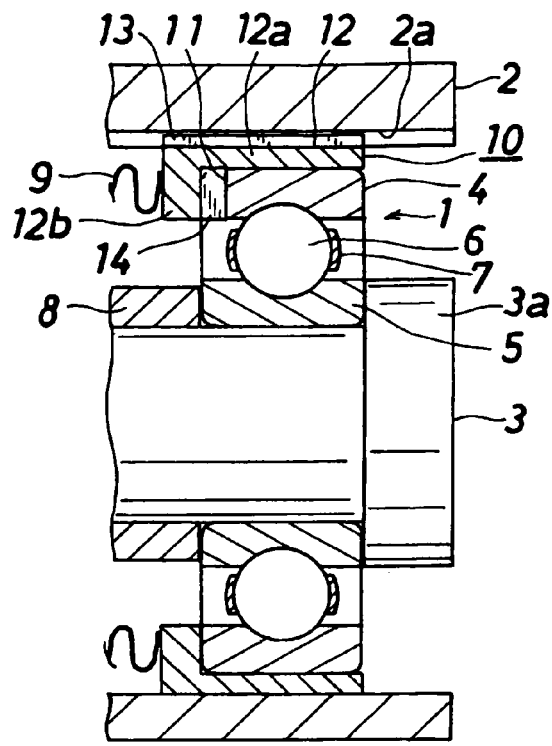
FIG. 1 is a vertical sectional view showing a bearing apparatus in a first embodiment according to the invention.
Figure 2:
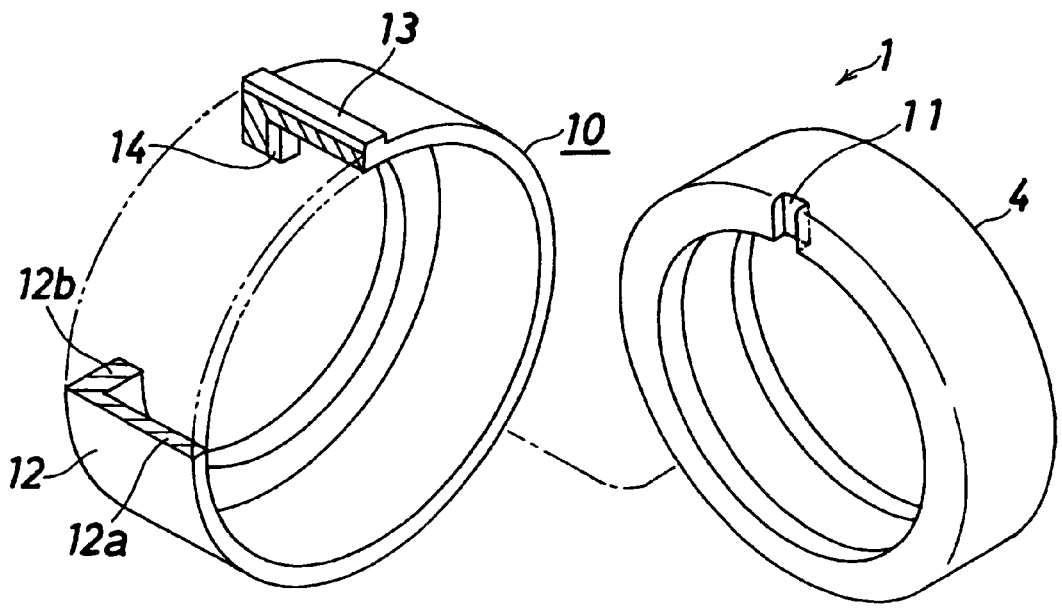
FIG. 2 is an exploded perspective view of the bearing apparatus in FIG. 1.

FIGS. 1 and 2 show the bearing apparatus according to a first embodiment of the invention.

A bearing apparatus 1 is provided between an axle box 2 and a rotation shaft 3, and includes an outer ring 4 supported by the axle box 2, an inner ring 5 which rotates with the rotation shaft 3, a plurality of balls (rolling elements) arranged between the two rings 4 and 5, a cage 7 for holding the balls 6, and a key member 10 in an annular shape which is interposed between the axle box 2 and the outer ring 4 so that the outer ring 4 can be supported by the axle box 2 so as not to rotate but so as to move in an axial direction.

The axle box 2 is formed of metal, and provided with a key groove 2a extending in the axial direction. Because the outer ring 4 is movable in the axial direction within a range defined by the key groove 2a, the rotation shaft 3 which is liable to vary in length due to thermal expansion is rotatably supported by the axle box 2.

The inner ring 5 is clamped between a flange part 3a provided at a right end of the rotation shaft 3 and a spacer 8, thereby to be fixed to the rotation shaft 3. The outer ring 4 is urged to the right by a pressurizing spring 9, but not fixed, and allowed to move in the axial direction.

The outer ring 4, the inner ring 5, and the balls 6 are formed of ceramics so that variation due to thermal expansion may be small.

In case where the outer ring is formed of metal, it would be sufficient that a key may be inserted into a key hole which is formed in the outer ring, and this key which has been inserted into the key hole may be movably inserted into a key groove formed in the axle box. However, in this bearing apparatus 1, it is difficult to work the key hole in the outer ring 4, because the outer ring 4 is formed of ceramics which is brittle material. Considering workability of the outer ring 4 which is formed of ceramics, it is possible to easily work a key groove, provided that the key groove extends from one end to the other end in the axial direction on an outer peripheral surface of the outer ring 4, or in case where the key groove extends from an inner diameter to an outer diameter at one end of the outer ring 4. In case where the key groove extends from the one end to the other end in the axial direction, there is such possibility that the key member may fall, when the outer ring is displaced in the axial direction. Therefore, in this bearing apparatus 1, a key groove 11 is so formed as to radially extend from the inner diameter to the outer diameter on a left end surface of the outer ring 4.

The key member 10 includes an annular body 12 having a cylindrical part 12a and an inwardly directed flange part 12b which is provided at a left end of the cylindrical part 12a, an outwardly projecting part 13 which is provided in an upper part of an outer peripheral surface of the cylindrical part 12a of the annular body 12 along its entire length in the axial direction and adapted to be inserted into the key groove 2a of the axle box 2, and an inwardly projecting part 14 which is provided on a right surface of the inwardly directed flange part 12b of the annular body 12 and adapted to be inserted into the key groove 11 of the outer ring 4.

The outwardly projecting part 13 is so shaped as to move in the axial direction in the key groove 2a of the axle box 2, while the inwardly projecting part 14 is so shaped as not to move both in a circumferential direction and inwardly in the axial direction. Therefore, in FIG. 1, when a length of the rotation shaft 3 has varied due to thermal expansion, the outer ring 4 moves in the axial direction along the axle box 2, whereby the variation due to the thermal expansion can be absorbed.

The cylindrical part 12a of the key member 10 has an outer diameter which is substantially equal to an inner diameter of the axle box 2, and an inner diameter which is substantially equal to an outer diameter of the outer ring 4. At the same time, a length of the cylindrical part 12a in the axial direction is equal to a length of the outer ring 4 in the axial direction plus a length of the inwardly directed flange part 12b in the axial direction. As the results, the cylindrical part 12a of the key member 10 covers an entirety of the outer peripheral surface of the outer ring 4, and the inwardly directed flange part 12b of the key member 10 covers an entirety of a left end surface of the outer ring 4. Therefore, by fitting the key member 10 to the outer ring 4 from the left, the cylindrical part 12a of the key member 10 is engaged with the outer peripheral surface of the outer ring 4, and the inwardly projecting part 14 is engaged with the key groove 11 of the outer ring 4, whereby the key member 10 and the outer ring 4 can be handled as an integral body.

Second Embodiment

Figure 4:
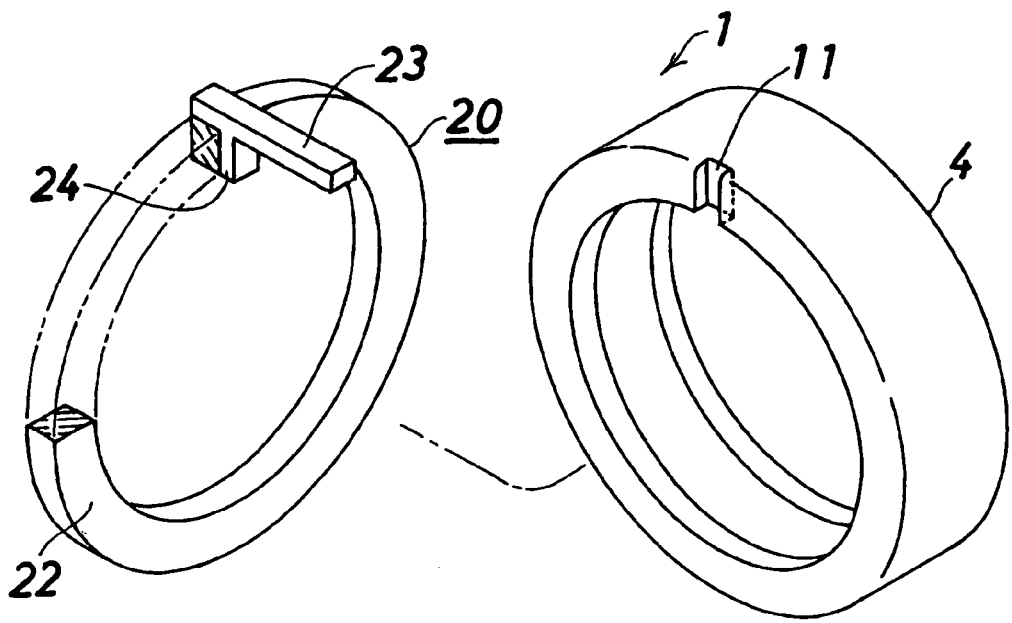
FIG. 4 is an exploded perspective view of the bearing apparatus in FIG. 3.

FIGS. 3 and 4 show the bearing apparatus according to a second embodiment of the invention.

The bearing apparatus 1 in the second embodiment is different from the first embodiment only in a structure of a key member 20. In the following description, the same members as in the first embodiment are denoted with the same reference numerals, and explanation of the members will be omitted.

In the first embodiment, it is possible to stably fit the key member 10 to the outer ring 4, because the cylindrical part 12a of the key member 10 is engaged with the outer peripheral surface of the outer ring 4. On the other hand, in case where the first embodiment is applied to the existing bearing apparatus, it is necessary to modify the bearing apparatus so that the inner diameter of the axle box 2 may be increased or the outer diameter of the outer ring 4 may be reduced, because the cylindrical part 12a is interposed between the axle box 2 and the outer peripheral surface of the outer ring 4.

The bearing apparatus 1 in the second embodiment can be applied to the existing bearing apparatus, without modifying the inner diameter of the axle box 2 and the outer diameter of the outer ring 4. The key member 20 includes an annular body 22 having a rectangular shape in cross section, an outwardly projecting part 23 which extends to the right from an upper part of an outer periphery of the annular body 22 and adapted to be inserted into the key groove 2a of the axle box 2, and an inwardly projecting part 24 which is provided on a right surface of the annular body 22 and adapted to be inserted into the key groove 11 of the outer ring 4.

Specifically, the annular body 22 has the same shape as the inwardly directed flange part 12b of the key member 10 in the first embodiment, except that the cylindrical part 12a is omitted from the key member 10 in the first embodiment. The outwardly projecting part 23 has such a length as extending from a left end surface of the annular body 22 to a right end surface of the outer ring 4, and at the same time, has such a shape that it can move in the axial direction in the key groove 2a of the axle box 2. The inwardly projecting part 24 has such a shape that it cannot move in the circumferential direction in the key groove 11 of the outer ring 4, and cannot move inwardly in the axial direction. Accordingly, in FIG. 3, when the length of the rotation shaft 3 has varied due to thermal expansion, the outer ring 4 moves in the axial direction along the axle box 2, whereby the variation due to the thermal expansion can be absorbed.

An inner diameter of the outwardly projecting part 23 of the key member 20 (a length between an axis center of the key member and a radially inner surface of the outwardly projecting part) is substantially equal to the outer diameter of the outer ring 4, and when the key member 20 is fitted to the outer ring 4 from the left, the outwardly projecting part 23 of the key member 20 is brought into contact with the outer peripheral surface of the outer ring 4, whereby frictional force will be generated. At the same time, the inwardly projecting part 24 of the key member 20 is engaged with the key groove 11 of the outer ring 4, whereby the key member 20 and the outer ring 4 can be handled as an integral body.

In the above described first and second embodiments, the key members 10, 20 are formed of resin such as PEEK (polyetheretherketone). The annular bodies 12, 22, the outwardly projecting parts 13, 23, and the inwardly projecting parts 14, 24 are integrally formed by injection molding.

The key member is not necessarily formed of resin, and also not necessarily formed as an integrally molded product.

Third Embodiment

Figure 5A:
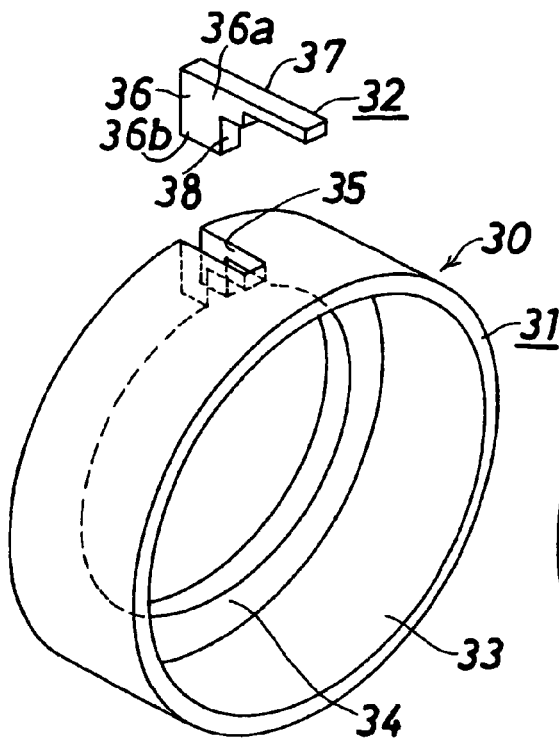
FIGS. 5A and 5B are perspective views showing a bearing apparatus in a third embodiment according to the invention.
Figure 5B:
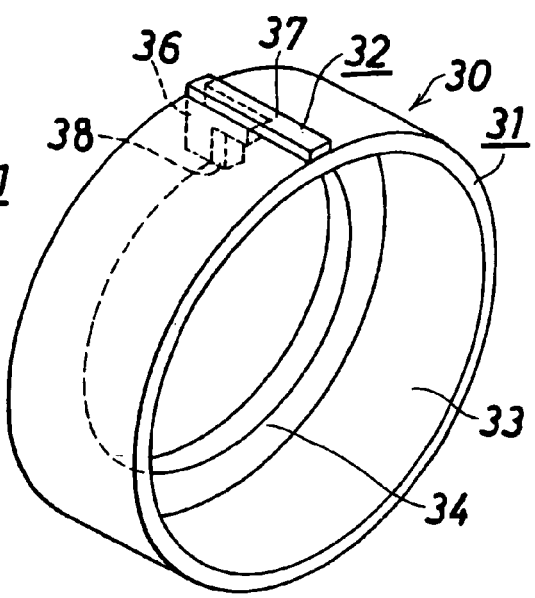

FIGS. 5A and 5B show the bearing apparatus according to a third embodiment of the invention. The third embodiment is different from the first and second embodiments in that a key member 30 is composed of two members.

The key member 30 in this embodiment includes an annular holding member 31 corresponding to the annular body, and an engaging member 32 which is engaged with a groove 35 formed in the annular holding member 31.

The annular holding member 31 includes a cylindrical part 33, and an inwardly directed flange part 34 which is provided at a left end of the cylindrical part 33. The inwardly directed flange part 34 is cut out at one position in the circumferential direction, and the cylindrical part 33 continued from the inwardly directed flange part 34 is cut out up to a center position in the axial direction, whereby the groove 35 to be engaged with the engaging member 32 is formed.

As shown in FIG. 5A, the engaging member 32 includes an inverted L-shaped part 36 having a horizontal portion 36a and a vertical portion 36b and adapted to be engaged in the groove 35, an outwardly projecting part 37 which extends in the axial direction from an upper part of the horizontal portion 36a of the inverted L-shaped part 36 and adapted to be inserted into the key groove 2a of the axle box 2, and an inwardly projecting part 38 which is provided at a right side of the vertical portion 36b of the inverted L-shaped part 36 and adapted to be inserted into the key groove 11 of the outer ring 4.

As shown in FIG. 5B, the annular holding member 31 and the engaging member 32 which are separate members are assembled, whereby the member having the same shape as the key member 10 as shown in FIG. 2 is obtained. Therefore, by fitting the key member 30 having the annular holding member 31 and the engaging member 32 to the outer ring 4, the same sectional shape as shown in FIG. 1 is obtained, and the same operational effect can be attained as the bearing apparatus 1 in the first embodiment.

Fourth Embodiment

Figure 6A:
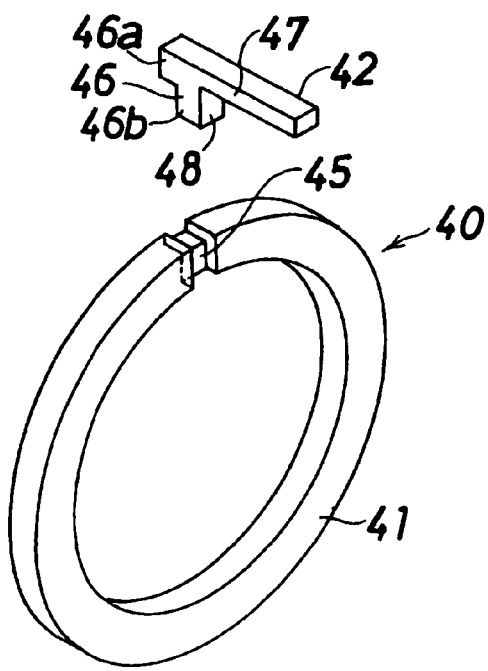
FIGS. 6A and 6B are perspective views showing a bearing apparatus in a fourth embodiment according to the invention.
Figure 6B:
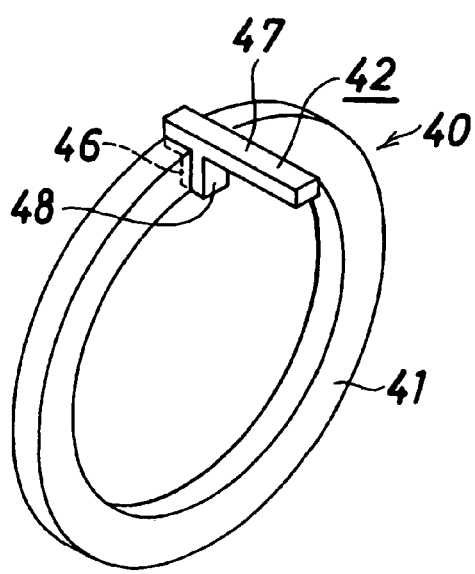

FIGS. 6A and 6B show the bearing apparatus according to a fourth embodiment of the invention. The fourth embodiment is different from the second embodiment in that a key member 40 is composed of two members.

The key member 40 in this embodiment includes an annular holding member 41 corresponding to the annular body, and an engaging member 42 which is engaged with a groove 45 formed in the annular holding member 41.

The annular holding member 41 has a square shape in cross section, and an outer peripheral surface and a right surface thereof are cut out at one position in a circumferential direction, whereby the groove 45 to be engaged with the engaging member 42 is formed.

As shown in FIG. 6A, the engaging member 42 includes an inverted L-shaped part 46 having a horizontal portion 46a and a vertical portion 46b and adapted to be engaged in the groove 45, an outwardly projecting part 47 extending in the axial direction from an upper surface of the horizontal portion 46a of the inverted L-shaped part 46 and adapted to be inserted into the key groove 2a of the axle box 2, and an inwardly projecting part 48 positioned at a right side of the vertical portion 46b of the inverted L-shaped part 46 and adapted to be inserted into the key groove 11 of the outer ring 4.

As shown in FIG. 6B, the same shape as the key member 20 as shown in FIG. 4 can be obtained, by assembling the annular holding member 41 and the engaging member 42 which are separate members. Therefore, when the key member 40 composed of this annular holding member 41 and the engaging member 42 is fitted to the outer ring 4, the same sectional shape as shown in FIG. 3 can be obtained, and the same operational effects as in the bearing apparatus in the second embodiment can be attained.

The annular bodies 12, 22, the outwardly projecting parts 13, 23, and the inwardly projecting parts 14, 24 of the key members 10, 20, and the annular holding members 31, 41, the engaging members 32, 42, the outwardly projecting parts 37, 47 and the inwardly projecting parts 38, 48 of the key members 30, 40 in the above described embodiments can be modified according to the shape of the axle box 2, and according to easiness in working the outer ring 4. One of the examples is shown in FIGS. 7 and 8.

Fifth Embodiment

Figure 7:
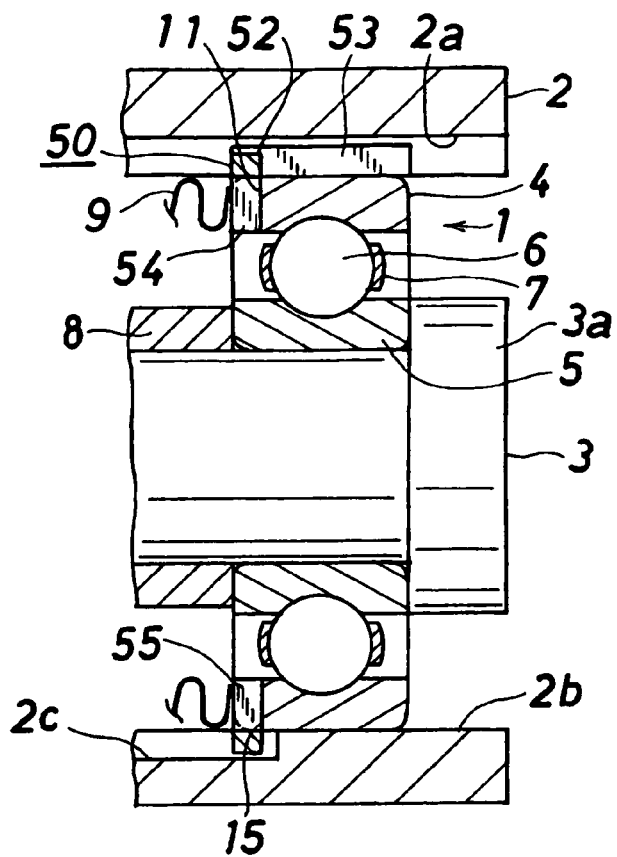
FIG. 7 is a vertical sectional view showing a bearing apparatus in a fifth embodiment according to the invention.
Figure 8:
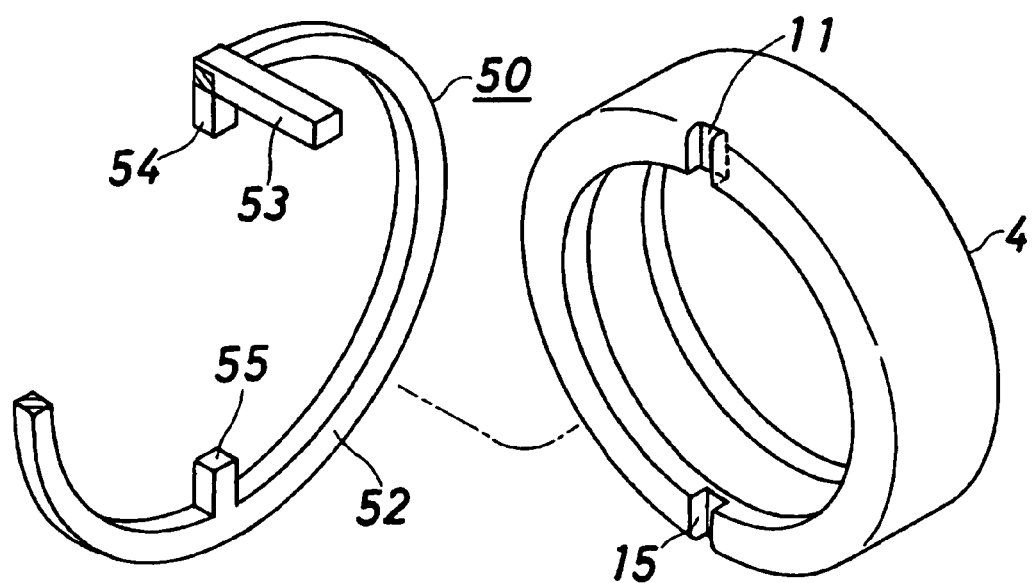
FIG. 8 is an exploded perspective view of the bearing apparatus in FIG. 7.

FIGS. 7 and 8 show the bearing apparatus according to a fifth embodiment of the invention.

In the bearing apparatus 1 in a fifth embodiment, the axle box 2 is provided with a small diameter inner peripheral surface 2b having an inner diameter which is substantially equal to the outer diameter of the outer ring 4, and a large diameter inner peripheral surface 2c having a larger inner diameter than the small diameter inner peripheral surface 2b. The outer ring 4 is supported by the axle box 2, in a state where its left end part is positioned on the large diameter inner peripheral surface 2c and the other part is positioned on the small diameter inner peripheral surface 2b. The key groove 2a of the axle box 2 is formed on the small diameter inner peripheral surface 2b. In addition to the key groove (an upper key groove) 11 which is formed in the first to fourth embodiments, another key groove (a lower key groove) 15 is formed at a position separated from it by 180 degree. A key member 50 includes an annular body 52 (flange part) in a square shape in cross section and having an inner diameter which is substantially equal to the outer diameter of the outer ring 4 and an outer diameter which is smaller than the large diameter inner peripheral surface 2c of the axle box 2, an outwardly projecting part 53 extending to the right from an outer periphery of the annular body 52 and adapted to be inserted into the key groove 2a of the axle box 2, an upper inwardly projecting part 54 provided in an upper part of an inner peripheral surface of the annular body 52 and adapted to be inserted into the upper key groove 11 of the outer ring 4, and a lower inwardly projecting part 55 provided in a lower part of an inner peripheral surface of the annular body 52 and adapted to be inserted into the lower key groove 15 of the outer ring 4.

There is no difference in working trouble between a work for forming only the upper key groove 11 extending from the inner diameter to the outer diameter, and a work for continuously cutting the outer ring 4 from one outer diameter to the other outer diameter, that is, the work for forming the upper key groove 11 and the lower key groove 15, and hence, the outer ring 4 in the fifth embodiment can be easily obtained in the same manner as the outer ring 4 in the first to fourth embodiments. Then, by engaging the inwardly projecting parts 54, 55 integrally provided on the annular body 52 respectively with the two key grooves 11, 15, the key member 50 can be stably fitted to the outer ring 4, although the key member 50 has no cylindrical part.

The bearing apparatus 1 in the fifth embodiment can be applied to the axle box 2 without altering the inner diameter of the axle box 2 and the outer diameter of the outer ring 4, and can attain the same operational effects as the bearing apparatus 1 in the second embodiment.

Sixth Embodiment

Figure 9:
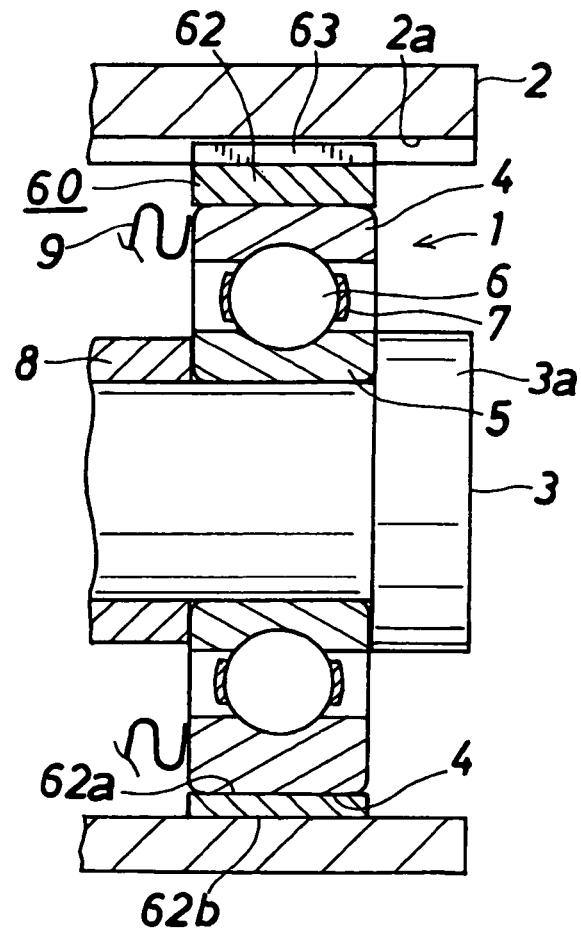
FIG. 9 is a vertical sectional view of a bearing apparatus in a sixth embodiment according to the invention.
Figure 10:
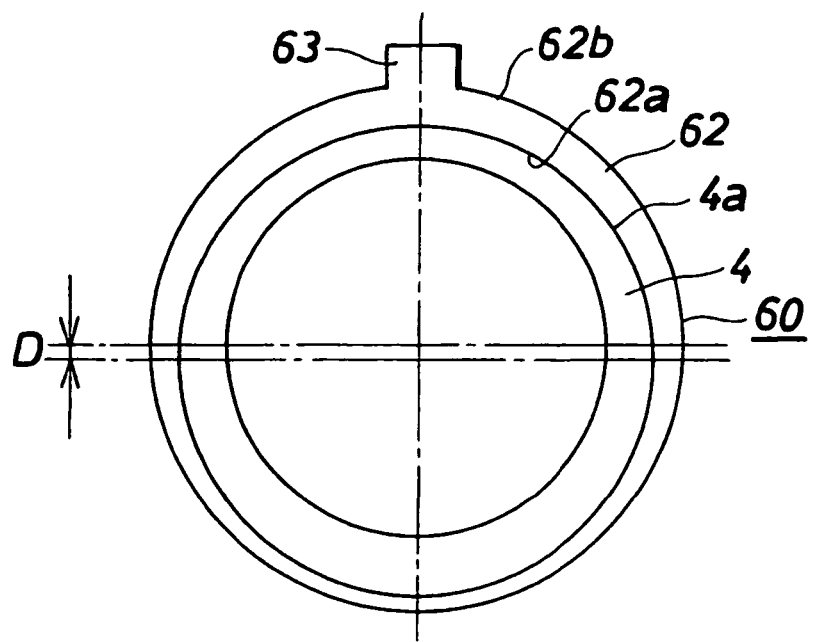
FIG. 10 is a view of a key member in the sixth embodiment as seen in the axial direction.

FIGS. 9 and 10 show the bearing apparatus according to a sixth embodiment of the invention.

In case of working the outer ring 4 formed of ceramics which is brittle material, it is also possible to form the outer peripheral surface of the outer ring 4 as an eccentric surface. In a bearing apparatus 1 in a sixth embodiment as shown in FIGS. 9 and 10, an eccentric surface 4a is formed on the entire outer peripheral surface of the outer ring 4, by working the outer peripheral surface of the outer ring 4 so as to make a cylindrical surface which is eccentric by D in a downward direction from an axis center. Correspondingly, a key member 60 includes an annular body 62 which has an inner peripheral surface 62a along the eccentric surface 4a of the outer ring 4 and a cylindrical outer peripheral surface 62b having an outer diameter which is substantially equal to the inner diameter of the axle box 2, and an outwardly projecting part 63 provided in an upper part of the outer peripheral surface 62b of the annular body 62 and adapted to be inserted into the key groove 2a of the axle box 2.

The outwardly projecting part 63 is so shaped as to be movable in the axial direction in the key groove 2a of the axle box 2, and therefore, in case where the length of the rotation shaft 3 has varied due to thermal expansion, in FIG. 9, the variation due to the thermal expansion can be absorbed, since the outer ring 4 moves in the axial direction along the axle box 2.

In the sixth embodiment, because the eccentric inner peripheral surface 62a of the key member 60 is engaged with the eccentric outer peripheral surface 4a of the outer ring 4, the key member 60 can be stably fitted to the outer ring 4. It is of course possible to produce the key member 60 as a resin molded product, and to fit this key member 60 to the outer ring 4 from the left. However, it is more preferable to produce the outer ring 4 provided with the eccentric surface 4a on the outer periphery by molding out of resin, employing the resin molding process, and to obtain the key member 60 which is integrally molded to the outer ring 4. In this manner, it is possible to produce the key member 60 and to handle it thereafter, more easily.

Moreover, according to the sixth embodiment, the shape of the axle box 2 need not be modified, by making the outer diameter of the key member 60 equal to the inner diameter of the axle box 2. Further, because the eccentric surface 4a need not be provided on the entirety of the outer ring 4 (from one end in the axial direction to the other end), the eccentric surface 4a may be formed only in the left end part of the outer ring 4, while the key groove 11 in the fifth embodiment as shown in FIG. 7 is replaced by an eccentric groove having the same length in the axial direction as the key groove 11. In this manner, it is possible to maintain the outer diameter of the outer ring 4.

What is claimed is:

1. A bearing apparatus to be supported by an axle box which includes a key groove, the bearing apparatus comprising:
    an outer ring which includes a first key groove extending from an inner diameter to an outer diameter of an axial end surface of the outer ring;
    an inner ring;
    rolling elements rollably interposed between the outer and inner rings; and
    a key member which includes an annular body, a first inwardly projecting part which is provided on the annular body and adapted to be inserted into the first key groove of the outer ring, and an outwardly projecting part which is provided on an outer periphery of the annular body and adapted to be inserted into the key groove of the axle box, and
    wherein the outwardly projecting part extends axially outward of an axially outermost portion of the annular body.

2. The bearing apparatus according to claim 1, wherein the outer ring includes a second key groove, and wherein the key member includes a second inwardly projecting part which is provided on the annular body and adapted to be inserted into the second key groove of the outer ring.

3. The bearing apparatus according to claim 2, wherein the second inwardly projecting part is disposed opposite the first inwardly projecting part.

4. The bearing apparatus according to claim 2, wherein the second inwardly projecting part is configured so as to extend, in an axial direction of the annular body, from an axially inward end face of the annular body to an axially outward end face of the annular body.

5. The bearing apparatus according to claim 1, wherein a radially outer periphery of the outwardly projecting part is disposed radially outward of the outer periphery of the annular body.

6. The bearing apparatus according to claim 1, wherein the outwardly projecting part is disposed so as to overlap, in a circumferential direction of the annular member, the first inwardly projecting part.

7. The bearing apparatus according to claim 1, wherein the outwardly projecting part comprises a square cross section.

8. The bearing apparatus according to claim 1, wherein the annular body has an inner diameter substantially equal to the outer diameter of the outer ring.

9. The bearing apparatus according to claim 1, wherein the annular body comprises a square cross section.

10. The bearing apparatus according to claim 1, wherein the first inwardly projecting part extends radially inward to the inner diameter of the outer ring.

11. The bearing apparatus according to claim 1, wherein the outwardly projecting part extends from the annular body to an opposite axial end face of the outer ring.

12. The bearing apparatus according to claim 1, wherein the outwardly projecting part has a thickness, in a circumferential direction of the annular body, less than a circumference of the annular body.

13. The beating apparatus according to claim 1, wherein the second inwardly projecting part comprises a width, in an axial direction of the annular body, substantially equal to a width of the annular body.

14. The bearing apparatus according to claim 1, wherein the axially outermost portion of the annular body comprises an axial end face of the annular body.

* * * * *